March 25, 1924.
H. DALTON
HEADSTOCK
Filed Oct. 11, 1921
1,488,232
3 Sheets-Sheet 1
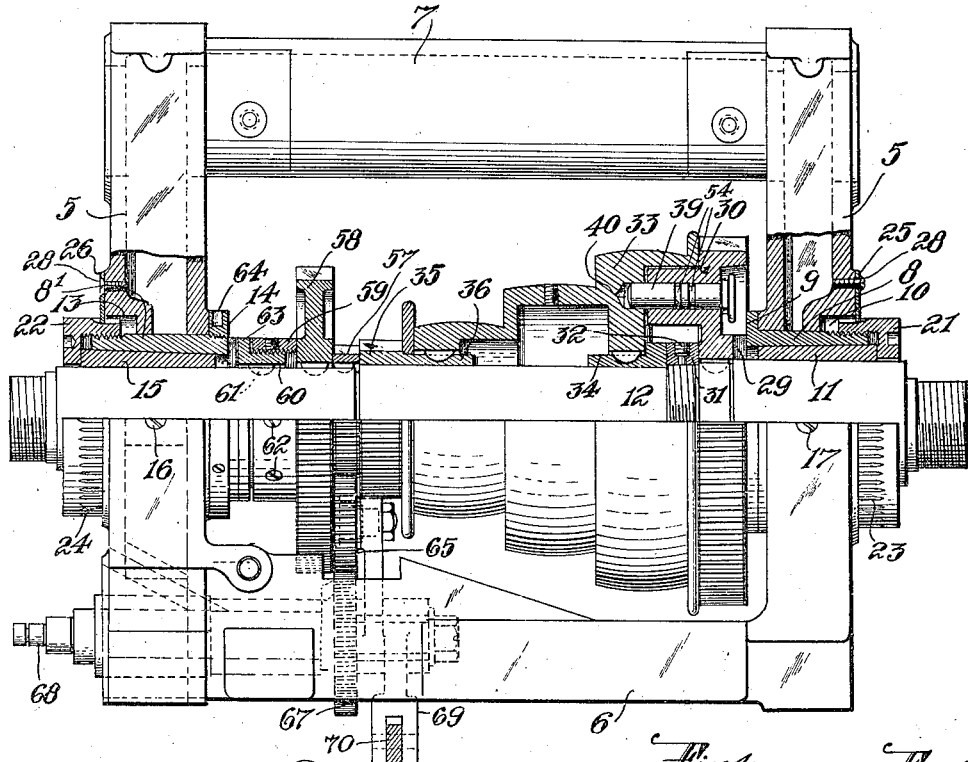
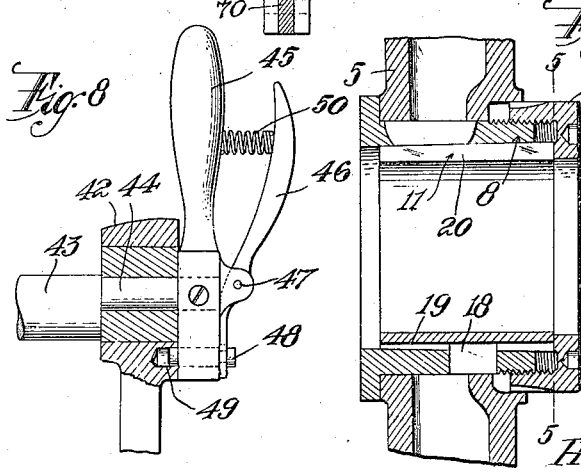
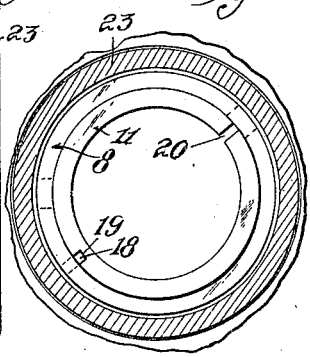
INVENTOR
Hubert Dalton
BY C. P. Goepel
ATTORNEY

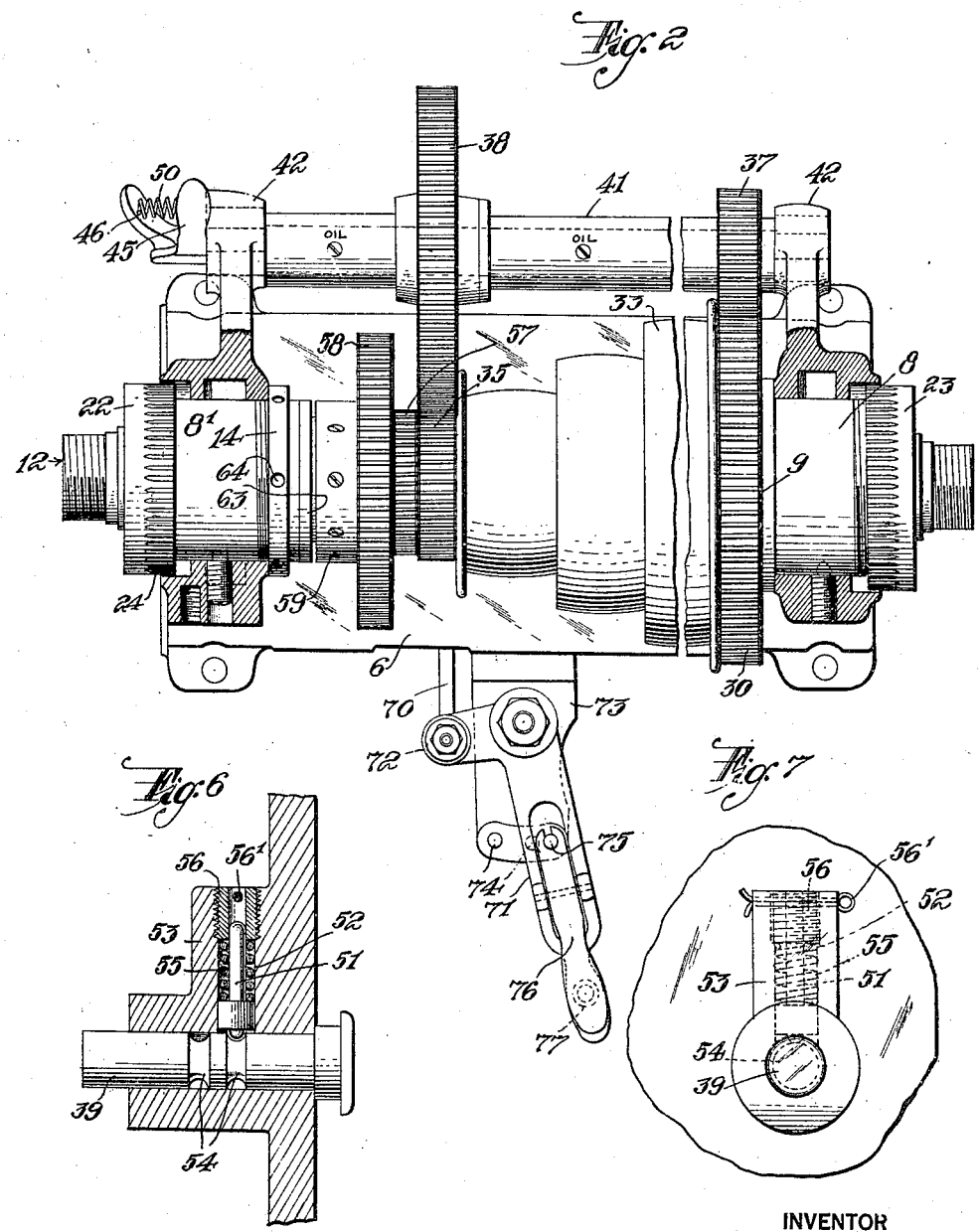

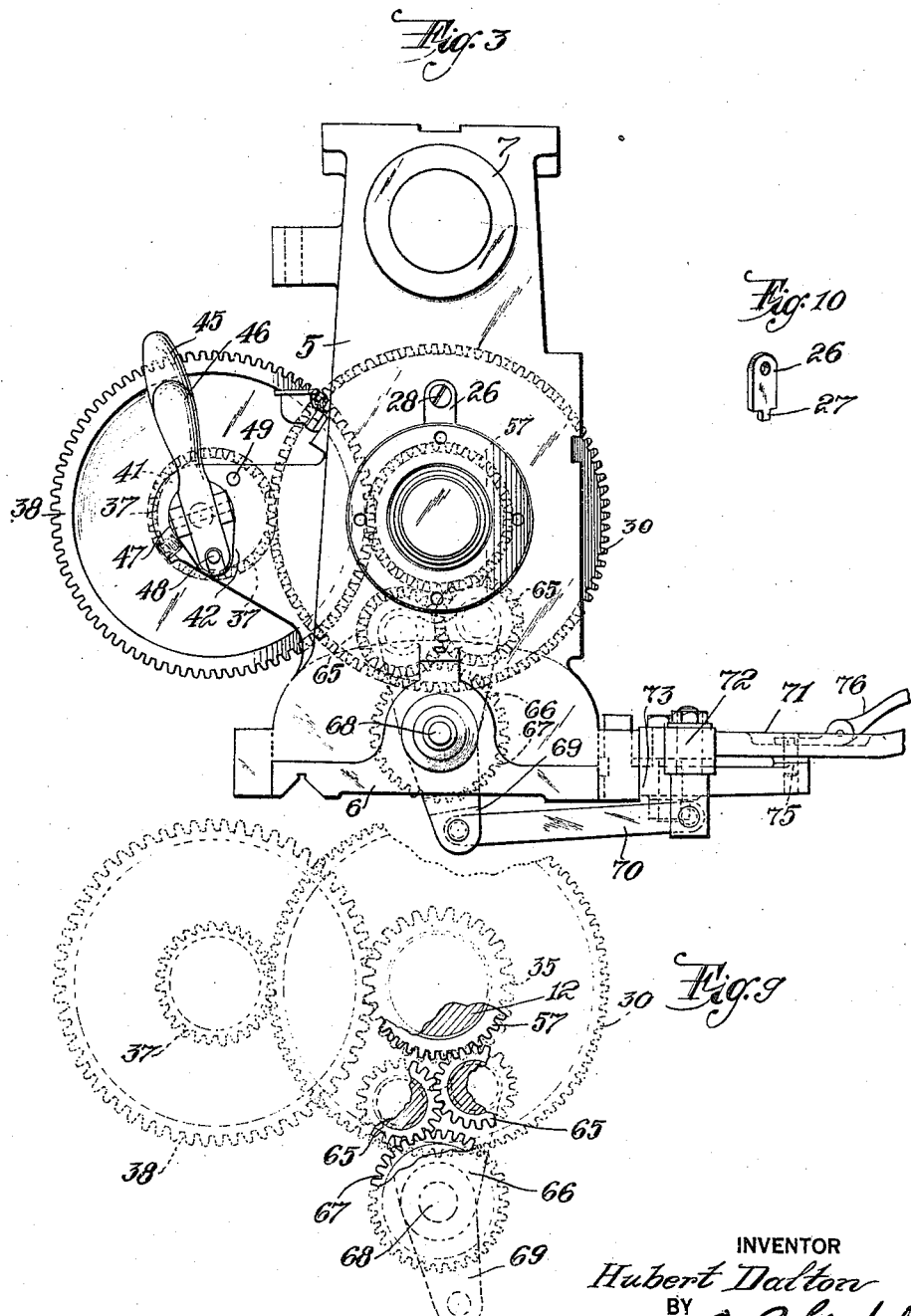

Patented Mar. 25, 1924.

1,488,232

UNITED STATES PATENT OFFICE.

HUBERT DALTON, OF NEW YORK, N. Y.

HEADSTOCK.

Application filed October 11, 1921. Serial No. 507,033.

*To all whom it may concern:*

Be it known that I, HUBERT DALTON, a citizen of the United States, and a resident of New York city, in the county of New York and State of New York, have invented certain new and useful Improvements in Headstocks, of which the following is a specification.

This invention relates to headstocks for lathes, milling machines and other similar metal working machinery.

Broadly considered, the primary object and purpose of the present invention is to provide what may be aptly termed a double end headstock, or in other words, a headstock by means of which the cutting tool or tools may be driven from either one or both ends of the main driving spindle.

Heretofore in headstocks for lathes and analogous machines, it has been possible to apply the tool driving connection to only one end of the driving spindle since provision is made for taking up or compensating longitudinal end thrust of the driving spindle in only one direction.

My present invention is, therefore, primarily characterized by the fact that simple and effective means is provided for the adjustment of the journal bearing bushings at each end of the driving spindle to effectually compensate for wear incident to longitudinal end thrust in either direction.

It is also another object of my invention to provide means for driving the spindle at various speeds including a stepped pulley loosely mounted upon the spindle, and back gears. At each end of the pulley, gears adapted for engagement by the back gears are arranged, one of which is keyed or otherwise fixed to the pulley while the other is fixed upon the spindle. Means is provided for detachably locking the latter gear to the pulley for the direct drive of the spindle and upon the disconnection of said gear from the pulley and the shifting of the back gears into engagement with the gears on the spindle, the spindle is then driven at relatively different speeds through the back gears.

It is also another object of my present improvements to provide improved means for driving the lead screw of a lathe or other similar operating part from the headstock spindle in either direction without reversing the direction of rotation of the spindle.

With the above and other objects in view, the invention consists in the improved headstock construction and in the form and arrangement of its several parts as will be hereinafter more fully described, illustrated in the accompanying drawings and subsequently incorporated in the subjoined claims.

In the drawings wherein I have illustrated one practical and satisfactory embodiment of the invention and in which similar reference characters designate corresponding parts throughout the several views:

Figure 1 is a side elevation partly in section showing the several parts of the headstock assembled on the driving spindle;

Figure 2 is a top plan view partly in section;

Figure 3 is an end elevation;

Figure 4 is a detail section through one of the journal bearings for the driving spindle;

Figure 5 is a section taken on the line 5—5 of Figure 4;

Figure 6 is a detail sectional view showing the retaining means for the locking pin connecting the driving gear on the spindle to the pulley;

Figure 7 is a detail elevation showing the mounting for the locking pin upon the gear;

Figure 8 is a detail view partly in section illustrating the means for operating the eccentric shaft for shifting the back gears;

Figure 9 is a detail view showing the arrangement of the reversing gearing for the lead screw or other machine part to be driven from the headstock spindle, and Figure 10 is a detail perspective view of one of the parts.

In the accompanying illustrated embodiment of my invention I have shown the headstock frame in the form of a casting having hollow vertical end-standards 5 connected at their lower ends by the base plate 6 and also suitably connected and braced at their upper ends as at 7. While I preferably employ a box type headstock frame of this character, it is to be expressly understood that in so far as the merits of the present invention are concerned, the several novel features which I shall presently disclose in detail, are not necessarily limited in their utility to application and use in connection with a headstock frame of this particular type.

The end-standards 5 of the frame casting are suitably bored to receive the sleeves or bearing retainers 8 and 8' respectively. The retainer sleeve 8 in the right hand standard 5 is provided upon its inner end with an outwardly projecting annular flange 9 which tightly abuts against the inner side of said standard, which is machined to provide a suitable bearing surface for said flange. The other end of the retainer 8 is threaded and the outer side of the standard 5 is formed with an annular recess 10 surrounding this threaded end of the retainer sleeve. The inner surface of this sleeve 8 is longitudinally tapered to accommodate a similarly tapered bushing 11 of hard bronze, or other good wear resisting bearing metal within which one end of the main driving spindle 12 of the headstock is directly journaled.

The retainer sleeve 8' which is mounted in the left hand standard 5 of the headstock frame is threaded at both of its ends, this standard being likewise provided in its outer side with an annular recess 13 surrounding one threaded end of the sleeve. Upon the inner threaded end of this sleeve the thrust bearing collar 14 is engaged and has bearing contact against a machined surface of the standard. This collar, like the flange 9 on the retainer sleeve 8, acts as a bearing surface for the longitudinal end thrust of the spindle 12. The sleeve 8' also has an internal taper to receive the tapered bearing bushing 15 in which the left hand end of the spindle 12 is directly journaled. After the proper adjustment of the collar 14 it may be locked in place upon the end of the sleeve 8' by means of suitable set screws. The sleeves 8 and 8' are further rigidly fixed in the frame standards by means of set screws 17 and 16 respectively.

Upon reference to Figures 4 and 5 of the drawings, it will be noted that in each of the sleeves 8 and 8', in the lower portion thereof and substantially midway between its ends, a key 18 is fixed. This key extends into a longitudinal keyway or groove 19 cut in the outer face of the bushing 11 or 15 for its entire length. The depth of these keyways is substantially equal to one-half the thickness of the bushing. At a diametrically opposite point, each bushing is longitudinally split for its entire length as at 20. The keys 18 serve to retain the bushings 11 and 15 in proper alignment. The keyways 19 are machined so as to allow for the free longitudinal movement of the bushings relative to the retaining sleeve and owing to the provision of these comparatively deep keyways, the split bushings may easily contract to compensate for wear on the inner surfaces thereof and maintain the bushings in proper bearing engagement with the driving spindle. Of course the keys 19 also serve to prevent a rotative movement of the bearing bushings in the respective retaining sleeves.

The adjustment of the bushings 11 and 15 is effected through the medium of the collars 21 and 22 respectively which are threaded upon the outer ends of the retaining sleeves 8 and 8' and extend into the recesses 10 and 13 in the standards 5. These collars as they are threaded upon the sleeves engage with the outer ends of the respective bearing bushings 11 and 15 and force the same inwardly into said sleeves. Owing to the longitudinal taper of the contacting faces of the sleeves and the bushings, in this inward movement of the bushings, they are diametrically contracted and thereby tightened upon the periphery of the driving spindle 12. The outer surface of each collar 21 and 22 is provided with an annular series of fine teeth 23 and 24 respectively and after these collars have been adjusted, they are securely locked and held in such adjusted positions against rotative movement by means of the dogs 25 and 26 each of which is fixed at one of its ends to the outer side of one of the standards 5 and at its other end is provided with a locking tooth 27 for engagement with the teeth 23, 24 on the collars. Thus the collars are securely locked against movement from their adjusted positions which might result from vibration or other causes. The locking dogs are secured to the standards by means of screws 28 which can be readily removed to disengage the dogs from the collars when it again becomes necesary to adjust the latter.

In a double end headstock of this character wherein the driving force is transmitted to the cutting tool or other operative part from either end of the driving spindle, it is quite important that provision should be made for taking up end thrust at both ends of the spindle. In the ordinary headstock where the driving connection is made to only one end of the spindle, the longitudinal thrust is all in one direction so that it is a relatively easy matter to overcome this end thrust.

In my present construction, in order to counteract the effects of end thrusts of the spindle in either direction, I provide at the right hand end of the spindle, a thrust collar 29 of anti-friction bearing metal or fibre surrounding the driving spindle and located between the flange 9 of the retainer sleeve 8 and the master gear 30 which is keyed or otherwise suitably fixed to the driving spindle. This collar receives the end thrust when pressure is exerted from the left hand end of the spindle. The gear 30 is held against axial movement on the spindle by means of a collar 31 which has threaded engagement upon the spindle and is fixed in its adjusted position against the face of the gear 30 by one or more set screws 32.

The stepped driving pulley 33 is keyed at one of its ends upon the flanged sleeve 34 which loosely surrounds the spindle 12 and abuts against the collar 31. At its other end this pulley is keyed to the hub extension 36 of a gear 35 which likewise is loose upon the driving spindle.

As illustrated in Figure 2 of the drawings, in this embodiment of the invention, provision is made for six changes of speed. However, the number of speed changes might be increased or decreased to suit different conditions. In the present instance, three driving speeds for the spindle are obtained when the back gears, designated 37 and 38 respectively, are out of engagement with the gears 30 and 35. By inserting the axially movable locking pin 39 carried by the master gear 30 in the socket or recess 40 of the pulley 33, said pulley is locked to the driving spindle and in effect becomes a unit therewith. Thus, through the medium of the driving belt (not shown) which is engaged with one of the steps of the pulley, rotation is directly transmitted to the spindle.

When operating at slower speeds, the back gears 37 and 38 are thrown into meshing engagement with the gears 30 and 35 respectively. As herein shown, the back gears are connected by a tubular shaft 41 extending between bearings 42 in which the eccentrically disposed gudgeons 44 on the ends of a non-rotatable shaft 43 are mounted. To one of the gudgeons 44 a handle 45 is rigidly fixed and upon this handle a lever 46 is fulcrumed intermediate of its ends as at 47. One end of this lever is connected to a pin 48 loosely movable through an opening in the handle 45, and adapted for engagement in the sockets 49 formed in the bearing arm 42 and arranged in suitably spaced relation to each other. A coil spring 50 disposed between the opposite end of the lever and the handle 45 normally urges the handle to the position seen in Figure 8 and holds the pin 48 in locked engagement with the bearing. When this handle is in the position seen in Figure 3 of the drawings, the back gears 37 and 38 are in operating relation to the gears 30 and 35. When the handle is shifted from the position seen in Fig. 3 to engage the locking pin 48 in the other of the recesses or sockets 49, the tubular shaft 41 with the back gears 37 and 38 is shifted by the eccentric shaft 43 so that said gears are disengaged from the gears 30 and 35.

When the back gears are in operating position as seen in Figures 2 and 3 of the drawings, the pin 39 is first withdrawn from the socket 40 in the pulley 33 to disconnect said pulley from the gear 30. The driving power for the spindle 12 is now transmitted from the gear 35 connected to the pulley 33 to the back gear 38 and through the gear 37 to gear 30 which is fixed upon the spindle.

The locking pin 39 is retained in either of its adjusted positions by means of a pin 51 mounted in a guide opening 52 formed in a lug or projection 53 on the face of the gear 30. This pin is movable at right angles to the locking pin 39 and one end thereof is adapted for engagement in either of the spaced circumferential grooves 54 of the pin 39. The retaining pin 51 is urged to its effective position by means of a spring 55 extending between a shoulder on said pin and a sleeve 56 which is threaded into the outer end of the opening 52 and in the bore of which the outer end of the pin 51 is loosely engaged. A cotter pin 56' extends transversely through the projection 53 on the gear and through the outer end of the sleeve 56.

At the left of the gear 35, two gears 57 and 58 respectively are keyed upon the spindle 12. Between the gear 58 and the retaining sleeve 8' an adjustable collar is arranged, said collar consisting of outer and inner sections 59 and 60 respectively which have a threaded connection so that they may move relative to each other. The inner collar section 60 is keyed to the spindle 12 as at 61 so that it may slide freely thereon but is held against relative rotation. The outer collar section may also be securely fixed in its adjusted position with respect to the inner section by means of one or more set screws 62. One end of the collar section 59 abuts tightly against the face of the gear 58 and the relatively opposite end of the collar section 60 is provided with an annular flange 63. Between this flange and the end of the retaining sleeve 8' a thrust receiving collar 64 of anti-friction metal or fibre surrounds the spindle 12. This collar receives the end thrust when pressure is exerted from the right hand end of the spindle. All wear incident to end thrust of the spindle in either direction may be taken up or compensated for by expanding or adjusting the sectional collar interposed between the thrust collar 64 and the gear 58 and then locking the collar sections by means of set screws 62 in their adjusted position.

In the use of a double end headstock, particularly in connection with lathes or milling machines, it is necessary to make provision for transmitting power from the headstock spindle 12 to other operating parts of the machine. Thus, for instance, when the present invention is used in connection with a lathe or milling machine, the lead screw or driving rod for the carriage must be driven in either direction, and of course, in this particular case it is not permissible to reverse the direction of rotation of the main driving spindle. In the present instance this end is accomplished through the medium of the gear 57 fixed on the spindle which drives the reverse gearing shown in Figures 3 and 9 of the drawings. As therein shown, the two reversing gears 65 are mounted upon a bracket arm 66 and have constant meshing engagement with each other. One of these gears is engaged with a gear 67 fixed upon a shaft 68 which is journaled in suitable bearings on the headstock base. The bracket carrying the reverse gears is loosely mounted upon one end of the shaft, and said bracket has a second downwardly extending arm 69 which is connected by means of the rod 70 to the short angular arm 72 on the pivoted end of a lever 71. This lever is mounted upon a suitable support 73 fixed to the headstock base, said support being provided in its outer end with spaced openings 74. These openings are adapted to receive a locking pin 75 which is carried by one end of a lever 76 which is pivotally mounted upon the main lever 71. Between the levers 71 and 76 a spring 77 is interposed and operates to retain the pin 75 in its locking position. It will be understood of course, that suitable gears or other operating means are connected to the shaft 68 for the proper operation of other parts of the machine as may be required.

As seen in Figure 9 of the drawings, rotation is transmitted from the gear 57 fixed on the driving spindle to one of the reversing gears 65 through the other of the reversing gears engaged with the gear 67 to the shaft 68. When the lever 71 is swung upon the support 73 from the position shown in Figure 2 and the pin 75 engaged in another of the openings 74, the gear 65 shown engaged with gear 57 in Figure 9, is disengaged therefrom and the other of the gears 65 is moved around gear 67 and into meshing engagement with the gear 57 so that rotation will now be transmitted to shaft 68 in the opposite direction. When the pin 75 is engaged in the intermediate opening 74, the gears 65 are in a neutral position so that rotation is not transmitted to the shaft 68.

From the foregoing description taken in connection with the accompanying drawings, the construction and manner of operation of the present invention will be clearly understood. By means of my improved double end headstock, the utility of lathes, milling machines and like metal working machinery will be appreciably increased. The several parts are so assembled and arranged that access may be readily had thereto for the purpose of making the necessary adjustments whereby the driving spindle may at all times be kept in perfect alignment. The means above described for compensating for wear in the spindle bearings due to end thrust in either direction and the adjusting means for the bearing bushings insures the proper support of the spindle at all times in a constant axial position while permitting of its free rotation with a minimum of frictional resistance. It will also be observed that the several co-operating parts are of relatively simple form so that the headstock as a whole may be produced at nominal manufacturing cost.

While I have herein shown and described one preferred embodiment of the invention, it is nevertheless to be understood that the same is susceptible of many modifications in the form, proportion and relative arrangement of its several parts and I accordingly reserve the privilege of adopting all such legitimate changes as may be fairly embodied within the spirit and scope of the invention as claimed.

I claim:

1. A headstock for metal working machines including a spindle having means at each of its ends for the connection of a driven part thereto, a bearing for each end of said spindle, driving means on the spindle between said bearings, a thrust receiving collar engaged with the inner end of each bearing, and an adjustable device interposed between the drive means and one of said collars for compensating for wear in the bearings incident to end thrust of the spindle in either direction to thereby maintain the spindle in an axially fixed position.

2. A headstock for metal working machines including a spindle having means at each of its ends for the connection of a driven part thereto, a bearing for each end of the spindle, drive means on said spindle between the bearings, a thrust receiving collar engaged with the inner end of each bearing, and an adjustable longitudinally expansible collar interposed between said drive means and one of the thrust collars and keyed to the spindle to compensate for wear in the bearings incident to end thrust of the spindle in either direction to thereby maintain the spindle in an axially fixed position.

3. A headstock for metal working machines including a spindle having means at each of its ends for the connection of a driven part thereto, a bearing for each end of the spindle, drive means on the spindle between said bearings, a thrust receiving collar engaged with the inner end of each bearing, and an adjustable longitudinally expansible collar interposed between the drive means and one of said thrust collars and consisting of inner and outer sections having threaded connection and respectively engaging with the thrust collar and the drive means, said inner section being keyed to the spindle for longitudinal movement, and means for locking the collar sections in their adjusted positions to thereby compensate for wear in the bearings incident to end thrust of the spindle in either direction and maintain the spindle in an axially fixed position.

4. A headstock for metal working machines including a spindle having means at each of its ends for the connection of a driven part thereto, a bearing for each end of said spindle, each bearing consisting of a bushing engaged upon the spindle and a retaining sleeve for the bushing, said bushing and sleeve having frictionally engaged longitudinally tapered surfaces, means for independently adjusting the bushings longitudinally within the respective retaining sleeves to compensate for wear due to rotation of the spindle in the bushings, and additional adjustable means for compensating for wear in the bearings incident to end thrust of the spindle in either direction to thereby maintain the spindle in an axially fixed position.

5. In a headstock for metal working machines, a spindle, a bearing for the spindle comprising a fixed retaining sleeve and a bushing telescopically engaged within said sleeve, said bushing and sleeve having frictionally engaged longitudinally tapered surfaces, an adjustable collar threaded on one end of the sleeve and engaged with the corresponding end of the bushing, and means for locking said collar in its adjusted position upon the retaining sleeve.

6. In a headstock for metal working machines, a spindle, and a bearing for said spindle comprising a fixed retaining sleeve, a longitudinally split bearing bushing telescopically engaged within said sleeve and keyed thereto for longitudinal movement, said bushing and sleeve having frictionally engaged longitudinally tapered surfaces, a collar threaded upon one end of the sleeve and engaged with the corresponding end of the bushing to force the bushing into the sleeve and thereby contract said split bushing upon the spindle, and a locking dog coacting with means on the collar to retain said collar in its adjusted position upon the sleeve.

In testimony that I claim the foregoing as my invention, and I have signed my name hereunder.

HUBERT DALTON.